May 22, 1956 H. KNÄBEL 2,746,645
DISPENSER FOR CANNED LIQUID GOODS
Filed May 11, 1951
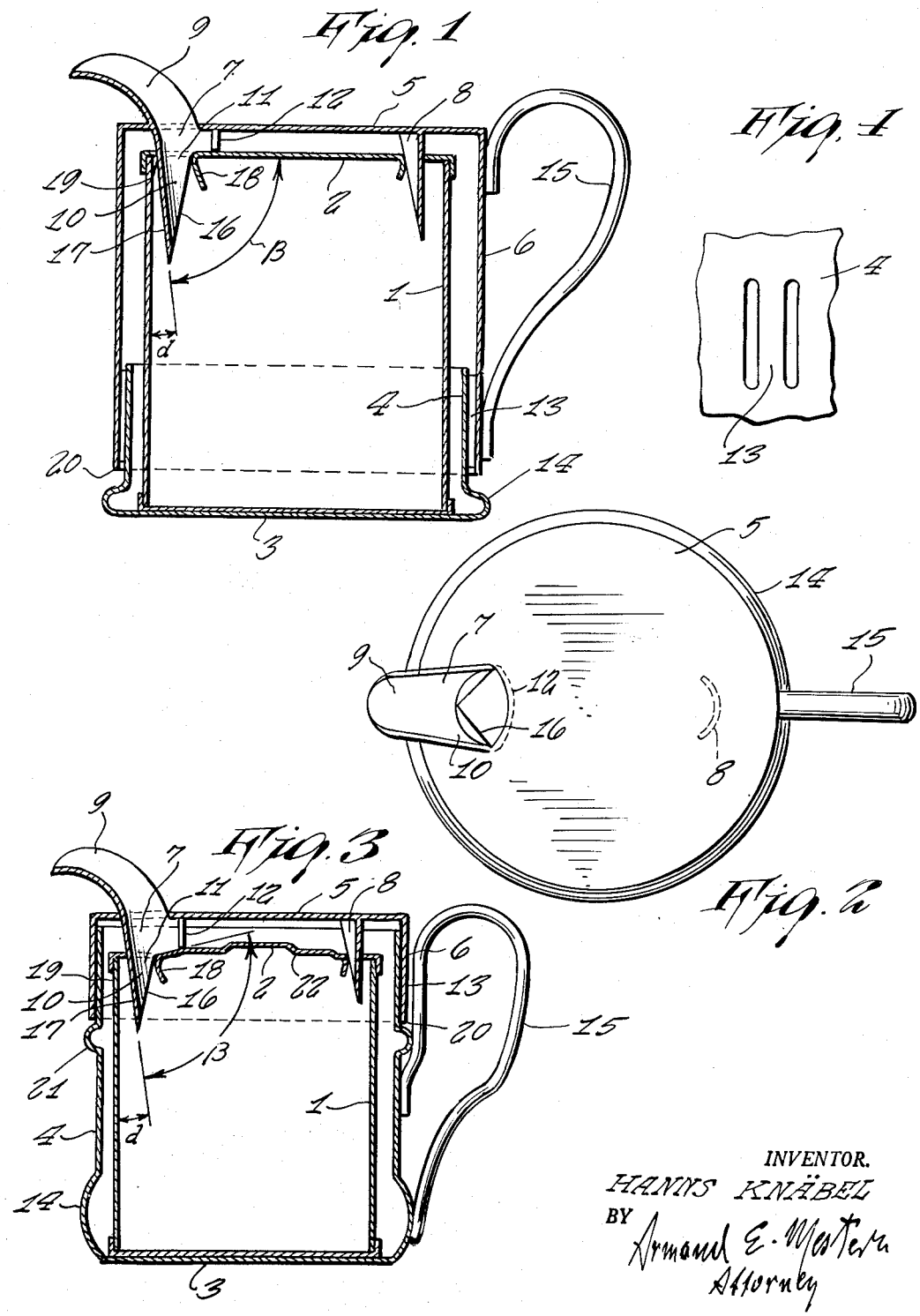
INVENTOR.
HANNS KNÄBEL
BY Armand E. Mestern
Attorney

# United States Patent Office 2,746,645
Patented May 22, 1956

2,746,645

DISPENSER FOR CANNED LIQUID GOODS

Hanns Knäbel, Esslingen (Neckar), Germany

Application May 11, 1951, Serial No. 225,693

3 Claims. (Cl. 222—86)

This invention relates to new and useful improvements in dispensers for canned liquids and has for its main object to provide, in a manner as hereinafter set forth, a device of this kind comprising a novel construction, combination and arrangement of parts by which a usual can containing, for instance, milk, fruit juices and other canned liquids, may be expeditiously opened and the contents poured therefrom as desired in a convenient and sanitary manner.

It is another object of the invention to provide a decorative dispenser of this kind which is adapted to completely enclose and conceal said can.

A further object of the invention is to provide a dispenser which is of simple construction, strong, durable, reliable in use, compact and of attractive appearance which may be manufactured at low cost.

These and other objects and advantages of the invention will become apparent from a consideration of the following detailed description taken in connection with the accompanying drawings wherein satisfactory embodiments of the invention are shown.

It is, however, understood that the invention is not limited to the details disclosed but includes all such variations and modifications as fall in the spirit of the invention and the scope of the appended claims.

The new dispenser according to the invention consists of the combination of a bottom part and, as a lid, a top part telescoping over said bottom part which, when put together, form a receptacle of the shape and size of a usual condensed milk can, etc.

The top part is provided with means for opening said can and with a spout combined with one of said opening means.

It is known in the art for the emptying of sealed cans filled with liquids to attach spouts or pouring devices of various sorts to the cover of the container or to its upper edge or to the bottom of the same. Furthermore, it has already been suggested to use a pouring device which consists of a holder with a cover guided by it, there being provided on the cover two inwardly projecting impressible pointed members of different length of which the larger one is equipped with a pouring aperture, while the smaller one serves for the admission of air.

It was found that with such a device, when a still full container is inclined, some of the liquid content escapes laterally alongside the impressible pointed member and that, owing to the differing lengths of the impressible pointed members, a jamming of the cover inserted over the holder part occurs because the puncturing at first takes place only at one lateral point.

According to the present invention, these and other disadvantages are reliably obviated in a simple manner by means of a novel arrangement and shaping of the pouring aperture as well as of the two impressible pointed members.

The improvements consist mainly in that two specially formed and shaped punches are provided for opening the can, comprising one punch which is provided with a pouring device shaped as a semi-open hollow half-cone or pyramid with ground cutting edges having cutting and enveloping surfaces which gradually widen from its point to its base. Another similar punch is provided as an air vent. Said punches are provided on the inner side of a hood which is to be put over the can to be opened. The punch connected with the pouring device or spout member is provided at its base with a ring-shaped collar or ring, which after the punch is pressed into the can of liquid, fits on the latter and precludes lateral escape of the liquid when the latter is being poured. Furthermore, there is provided therein a holder encompassed by and guiding the hood even before the punch is pressed into the cover, which, in combination with the hood, forms a closed container adhering to the hood by spring devices, whereby this adherence is so efficient that without special clamping devices not only its own weight, but that of the full liquid container as well, is supported by the holder.

Still another important feature of the new device consists therein that the center line of the hollow half-cone or pyramid-shaped punch is at a slight angle to the axis of the hood and/or of the liquid container, as a result of which the watertight fit between the punched cover of the container and the enveloping surface of the punch is established. Moreover, it is advantageous for a good fit of the hood on the liquid container to arrange the collar or ring on the inner side of the hood, not vertical to the center envelope line of the hollow half-cone or pyramid, but at an angle deviating therefrom. For smooth container covers this angle is advantageously somewhat less than 90°, whereas for tops with ridges pressed in, it should be greater than 90°.

In the drawings:

Fig. 1 is a longitudinal section through a liquid container arranged in the new dispenser. The hood of the dispenser rests on the bottom part of the same. The punches have pierced the top of the can of liquid arranged in the dispenser;

Fig. 2 is a top view of the hood, as shown in Fig. 1;

Fig. 3 is a longitudinal section similar to Fig. 1 through a somewhat different embodiment of the dispenser.

Fig. 4 is a partial front view of the wall of the bottom part of the dispenser.

In the said figures numeral 1 designates the can of liquid to be opened, closed by the cover 2. The can 1 is inserted into a holder 3 provided with an upward extending rim 4 which surrounds the can 1. A hood 5 is inverted over the can 1, its ring-shaped rim 6 extending downward and encompassing the rim 4 of holder 3.

On the inner side of hood 5, punch 7 and air vent punch 8 are provided, the punch 7 extending to the outside into the spout 9. Punch 7 on the inside is formed as a hollow semi-cone or semi-pyramid 10 whose base 11 is also the base of spout 9.

The air vent punch 8 is similarly formed, without, however, having an opening to the outside. The punch 7 is furthermore provided, at its base 11, with a collar or seat-ring 12 by means of which the punch 7 is attached to the hood 5, and which, after punching the punch 7 into the can to be opened, is seated on the can cover 2.

The rim 4 of the holder 3, moreover, is drawn up so high that when the hood 5 is inverted over the holder 3 its jacket 6 already encompasses the rim 4 before the points of punch 7 and of the air vent punch 8 contact the can cover 2.

The punching of the can is performed by means of pressure exerted on the hood 5 and is thus accomplished easily and securely without undesirable wedging, independent of the cross section and shape of the can 1. Satisfactory punching is achieved even if the can 1 is dented or deformed.

The drawn-up rim 4 of the holder 3 is provided with spring elements consisting, for instance, of a springy band 13, formed by parallel slits provided in the wall of the rim 4 as shown, or tongue springs or protruding bulges, so that the encompassing jacket 6 of the hood 5 is so securely guided and held by friction that not only the holder 3 but also the therein contained can of liquid 1, including its contents, is reliably carried and spilling of the liquid is prevented. After bringing the hood 5 into position over the holder 3 a closed unit is formed and the dispenser now has the appearance of a covered pitcher with pleasing outward appearance. The spring effect of the elements 13 is supported by a tubular shaped extension 14 provided between them and the bottom of the holder 3. On the outside of the jacket 6, opposite the spout 9, the handle 15 is provided.

The hollow semi-cone or pyramid 10 has smoothly-ground cutting edges 16, which consequently become constantly wider from the point of the punch 7 to the base 11, and according to the form of the hollow semi-cone or pyramid 10 form triangular or parabolic cutting edges whose point is the point of the punch 7. Due to this shape of the punch 7, flaps 18 are cut into the cover 2, when the can cover is punched. These flaps and also the remaining rim 19 of the opening formed are pressed inward or rolled, whereby a tight all around fit and wedging of the punch 7 in the cover 2 is insured. In case the can cover 2 does not consist of tinplate or other material which can be pressed in, but of brittle synthetic material or the like, the special shape of the punch 7 described heretofore causes similar flaps 18 to be split off when punching and thus likewise brings about a satisfactory tightness and wedging.

This necessary tightness is considerably supported by the arrangement of the hollow semi-cone or pyramid 10 in such a manner, that the jacket center line 17 of its jacket surface which constantly increases in width towards the base 10 deviates, by a small angle α from the direction of the cylindrical jacket of the can 1 and/or from that of the center axis of the ring-shaped jacket 6 of the hood 5. When inserting the punch 7, therefore, this deviation guarantees a wedging and thus a secure seat of the base 11 of the punch 7, and the tightness of the fit between the bent back flaps 18 and/or the rolled edge 19 of the can cover 2 is considerably improved. A loosening of the punch 7 is thus prevented.

After insertion of punch 7, the collar or ring 12 is seated on the can cover 2. It thus limits the depth of penetration of the punch 7, independent of the height of the can 1 and simultaneously forms a closure between the can cover 2 and the inside of the hood 5 so that no loss of liquid occurs on pouring.

A considerable improvement of this effect and of the tightness between the base 11 of the punch 7 and the bent back flaps 18 and/or the rolled edges 19 is also produced by the fact that the angle β between the jacket center line 17 of the hollow semi-cone or pyramid 10 and the underside of the collar or ring 12 deviates from a right angle. As a result, the bent back flaps 18 are supplementarily pressed downward, which considerably adds to the good fit and tightness of the can and the device.

In the embodiment according to Fig. 1, the angle β is somewhat less than 90° because, in this case the can 1 has a cover, 2 which is smooth on top. In the embodiment according to Fig. 3, the angle β is somewhat greater than 90° because, in this case, the can 1 is provided with a cover 2 with steps 22. Thereby, with a view to satisfactory tightness, an adjustment is caused with regard to the steps 22 in the cover 2 of the can 1.

In Fig. 1 the edge 4 of the holder 3 and the jacket 6 of the hood 5 are so proportioned to each other that the handle 15 is attached to the jacket 6. After the hood has been inverted in place, only the protruding ring-shaped bulge 14 of the holder 3 is visible. This covers the lower edge line 20 of the jacket 6, so that the hood 5 appears to be a closed pitcher. This embodiment suffices entirely for the usual sizes of cans for liquids as their weight is reliably taken care of by the above-described spring elements 13.

In the case of large and heavy cans, it is, as Fig. 1 indicates, a simple matter to draw the edge 4 of the holder 3 so far upward, the jacket 6 of the hood 5 being correspondingly shortened, that the handle 15 may be attached to the edge 4 of the holder 3. In this case, the spring elements 13 may be smaller or they may be replaced by a spring edge 4 of the holder 3, as the latter no longer need support the weight of the can 1. In this embodiment the lower edge line 20 of the jacket 6 of the hood 5 is visible but is balanced by an additional ring bulge 21 at the upper part of the edge 4 of the holder 3.

Although this invention has been described in connection with specific details of preferred embodiments thereof, it must be understood that such details are not intended to be limitative of the invention except as set forth in the accompanying claims. For instance piercing means may be detachably arranged on the hood which may be preferable if the device consists mainly of plastic.

In this case an additional plate, preferably of metal, will be provided, said plate covering the hood and carrying the punch 7 and the air vent punch 8. Guides provided in the hood permit the punches to extend into the hood.

I claim:

1. In an opening and pouring device, the combination of a container comprising as a bottom part a hollow body having a cylindrical side wall open at its upper end and a top part telescoping over said bottom part, said parts being adapted to be disposed over a can, the contents of which are to be poured, said bottom part being provided with means giving resiliency to said part, thereby holding tightly together by friction said bottom part and said top part, and the can encompassed by the same; and means for opening said can, consisting of two punches of half-open hollow semicone shape and provided with ground cutting edges, said punches depending from said top part and penetrating the top of said can when the parts of the container forming the pouring device are disposed over said can, one of said punches being connected to a pouring spout, and the other serving as an air vent, the punch with the pouring spout being arranged at the top of the upper part from which it extends at an angle deviating slightly from an angle of 90° between the longitudinal axis of said punch and the vertical axis of said top part.

2. The device set forth in claim 1, in which the punch connected with the pouring spout is arranged at the top part at an angle somewhat less than 90° for use with a can having a plane top surface.

3. The device set forth in claim 1 in which the punch connected with the pouring spout is arranged at an angle of somewhat more than 90° for use with a can having a grooved top surface.

References Cited in the file of this patent

UNITED STATES PATENTS

| Number | Name | Date |
|---|---|---|
| 1,221,724 | Haack | Apr. 3, 1917 |
| 1,837,057 | Mowlds | Dec. 15, 1931 |
| 2,038,356 | Hall | Apr. 21, 1936 |
| 2,159,897 | Karzenski | May 23, 1939 |
| 2,544,095 | Kower | Mar. 6, 1951 |
| 2,545,108 | Putnam | Mar. 13, 1951 |
| 2,556,311 | Winkler | June 12, 1951 |
| 2,589,890 | Stoecker | Mar. 18, 1952 |